UNITED STATES PATENT OFFICE.

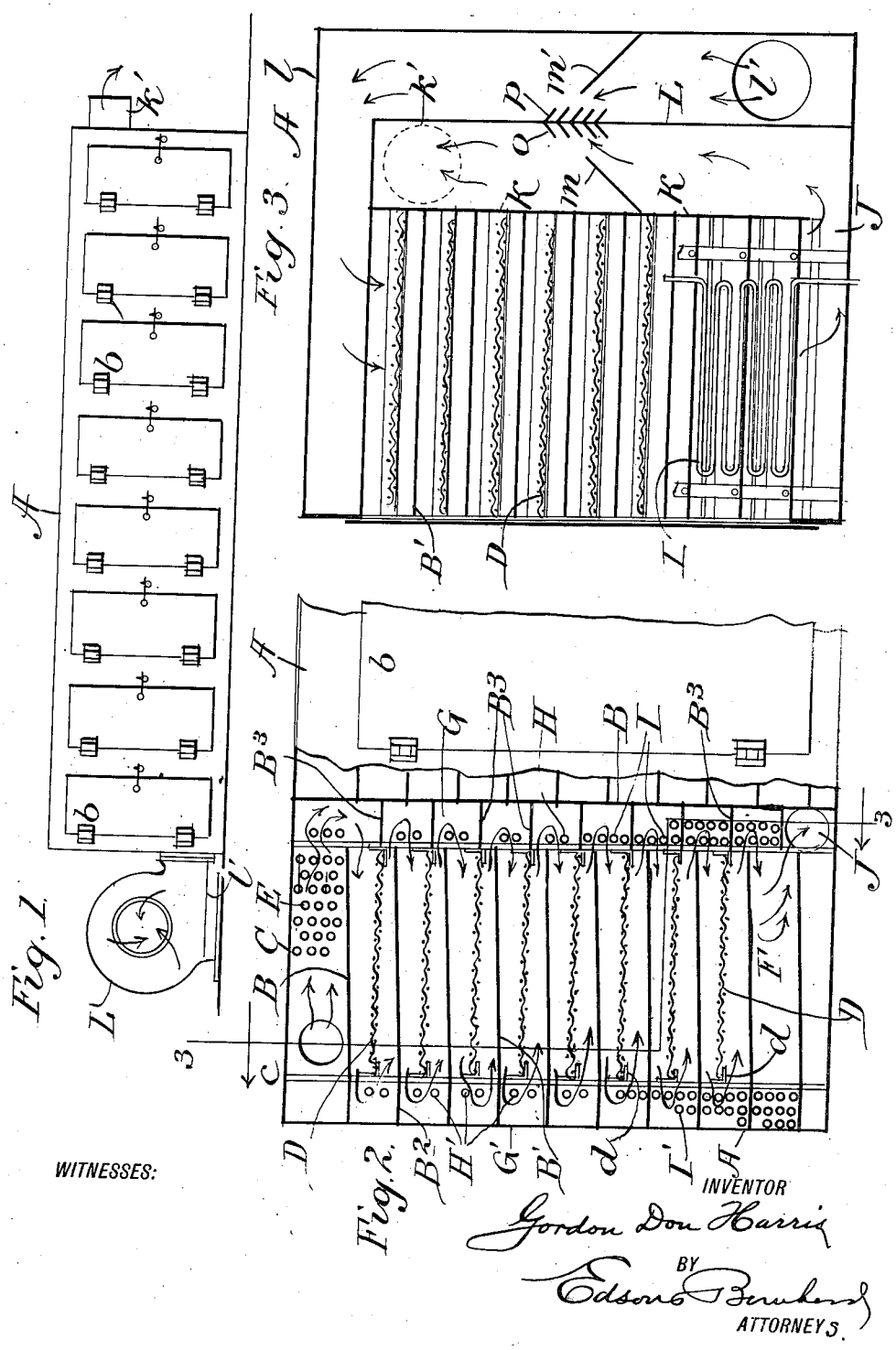

GORDON DON HARRIS, OF BAYONNE, NEW JERSEY.

PROCESS OF EVAPORATING MOISTURE-CONTAINING MATERIALS.

1,296,508.     Specification of Letters Patent.     Patented Mar. 4, 1919.

Continuation of application filed April 5, 1913, Serial No. 759,087. This application filed November 11, 1915. Serial No. 60,890.

*To all whom it may concern:*

Be it known that I, GORDON DON HARRIS, a citizen of the United States, residing at Bayonne, county of Hudson, and State of New Jersey, have invented a certain new and useful Process of Evaporating Moisture-Containing Materials, of which the following is a specification.

This invention is a process of drying various kinds of materials, such as peat, paints and paint materials, different kinds of fertilizers including humus and phosphates, soap in cake or bar form, linoleums and other coated materials in web or sheet form, and various other materials.

In another application filed on even date herewith, Serial No. 60,889 there is disclosed an evaporating apparatus suitable for carrying out the process of this invention, in which apparatus provision is made for utilizing a gaseous drying agent or medium, warmed to a suitable temperature, in such manner as to attain economy of operation by circulating such drying medium repeatedly into contact with the material under treatment.

My process involves the use of a gaseous drying agent, such as air, warmed to a temperature suitable for evaporating moisture from the particular material under treatment, but it is not desired to limit the invention to air as the moisture-evaporating agent, for the reason that boiler room gases or direct heat may be used in evaporating certain materials, particularly when such material will not be injuriously affected by high temperatures or when the material contains a large percentage of moisture, as in the case of peat; and, again, I may employ steam, or superheated steam, as the circulating moisture-evaporating medium, particularly in the evaporation of excess moisture from linoleums, or other coated materials, in order to effect oxidation of the coating applied to such material.

It is well established that a drying medium, such as air, heated to a predetermined temperature and brought into contact with a moist material absorbs a certain percentage of moisture from such material, as a result of which the temperature of said drying medium is lowered to an appreciable or perceptible extent, it may be one degree or more according to the moist condition of the material under treatment and the amount of moisture evaporated therefrom by the contact of the drying medium therewith.

The circulation of a warm or heated gaseous drying medium into contact successively with different layers of the moist material to be dried reduces the temperature of the drying medium, for the reason that evaporation, or the absorption of the moisture, cools such drying medium, and should this operation be carried on indefinitely, it follows that the drying medium will absorb moisture to the point of saturation, thus resulting in a substantial decrease in the temperature of said drying medium, at which time the relatively cooled and moisture-saturated drying medium will practically have lost its efficiency, having in view the moisture-carrying capacity of such medium.

In some prior structures it has been proposed to blow air into contact with the material and to immediately thereafter discharge the air, laden more or less with moisture absorbed from such material, thus involving loss of efficiency.

According to the present invention and for securing economy of operation, it is preferred to utilize a drying medium, such as air, warmed initially to a suitable temperature, and to circulate such warmed drying medium in paths substantially parallel to masses or layers of material undergoing treatment, the flow of the drying medium being retarded while in contact with the material and said drying medium being conducted into repeated contacts with successive layers of the material. Owing to the reduction in temperature of the drying medium each time it flows into contact with a layer of material, due to the evaporation of moisture therefrom, it is essential that said drying medium be reheated or boosted frequently in order to expand the gaseous medium and to maintain its moisture-carrying capacity at a certain standard, and to effect such boosting or reheating in my invention, the drying medium flows into contact with a boosting or reheating surface in the interval following its contact with one layer of material and prior to its contact with the next layer of material. Thus, the drying medium flows into contact with layers of material and the boosters or reheaters alternately, so that any reduction in temperature, due to the evaporation of moisture from the material, will be immediately thereafter counteracted by the action of the booster or reheater, for the purpose of maintaining the drying medium at a substantially uniform temperature while flowing through the apparatus.

According to a preferred mode of procedure in treating certain materials, a large volume of the gaseous drying medium is heated to a predetermined temperature, say 240° Fahrenheit, depending upon the nature of the material under treatment; this heated gaseous medium is conducted into contact with a layer of material, as a result of which it evaporates moisture and its temperature is lowered, say one degree or to 239° Fahrenheit; the drying medium then flows into contact with a steam coil, or other booster or heater, by which the drying medium is reheated to the original temperature, 240° Fahrenheit, whereby it is expanded to render it capable of evaporating more moisture; the drying medium flows again into contact with a layer of material, thus evaporating more moisture and slightly cooling it, say again to 239° Fahrenheit; the drying medium is again boosted or reheated to restore it to the initial temperature and expand it for evaporation of more moisture, and so on throughout the process until the drying medium acquires a certain saturation of moisture. It is thus apparent that the same volume of the drying medium is brought into contact with the successive layers, and that it is repeatedly heated and expanded for rendering it capable of evaporating moisture, whereby economy of steam is secured in heating and reheating or boosting the drying medium, and rapidity and economy of operation is attained in drying the material under treatment.

The foregoing operations may be carried out in a single material treating chamber, or in a series of such chambers.

Important steps of my process are, first, the circulation of the moisture-evaporating agent, such as air, into contact with the top and bottom surfaces of each layer of material, the direction of flow of the agent being reversed after it is in contact with each surface and as it flows from one layer to the next; and, second, retarding the flow of the moisture-evaporating agent so as to direct it against the material, on both the top and bottom surfaces thereof, so as to secure intimate contact of such agent with the material, thereby attaining increased efficiency and resulting in marked economy.

In addition to the functions and advantages hereinbefore recited, my mode of treatment secures other functions, chief among which is that the treatment of the mass by the drying medium is effected at a temperature which subsequent to the contact of said medium with the material, leaves the latter in a condition for the free transudation of moisture, while at the same time the flow of the drying medium into contact with the mass effects the desired exchange of heat from the gaseous medium for moisture from the mass of material, as a result of which treatment at a predetermined temperature the mass is left in the condition wherein it is free from a superficial coating and remains in such a condition that the moisture present in the material is and will pass to the surface of the mass so that the drying medium will continue to take up the moisture, the absorption of heat by the mass of material tending to put such material in condition wherein the moisture passes out from the interior of said mass.

According to this invention, the drying medium is at a temperature suited to the moisture content of the first mass, the contact of said drying medium at an appropriate and predetermined temperature effecting the exchange of heat for moisture from said first mass and leaving the latter in the necessary transudatory condition, and each of the other masses subsequent to the first is subjected to the same treatment as said first mass and so as to leave each subsequent mass in the same transudatory condition, for the reason that in the flow of said drying medium it is kept in, or maintained at the same temperature, or at a uniform temperature, by the reheating to which said drying medium is subjected by boosters positioned in the intervals between the successive masses and in the line of flow of the gaseous medium, whereby there is accorded to all the masses of material a treatment which is highly efficacious and is carried out with marked economy in the consumption of steam supplied to the boosters or reheaters and the preheater when the latter is utilized.

In the ordinary treatment of many materials by the evaporation process it is found that the masses of material acquire a superficial coating, or so-called "skin," upon the surface of the mass, and, further, that the masses nearest the point of heat inlet give off their moisture content rapidly whereas the masses of material remote to the heat inlet part with their moisture more slowly. Said two conditions, the superficial coating on the masses and the slow drying of the masses remote to the heat inlet, make it essential to continue the circulation of heat until the masses remote to the heat inlet are dried to the desired extent, but it at once becomes apparent that such treatment is not only unsatisfactory because the superficial coating on the masses precludes to a material extent the evaporation of moisture, but it is also wasteful of energy for the reason that to dry the masses remote to the heat inlet the application of heat to all the masses must be prolonged for a substantial period of time and results, furthermore, in an undesirable condition in the masses next to the heat inlet.

Such disadvantages are overcome and obviated in my mode of treatment, for the reason that each mass throughout the series is left in a condition for the free transudation of moisture so that the drying medium, at a temperature apportioned to the moisture content of the masses, is kept by the boosting or reheating operation uniformly at such predetermined temperature. It follows that the masses treated as described will not produce a superficial coating, and that each mass is subjected to the same treatment as the first mass, in consequence of which the exchange of heat for moisture is carried out with marked economy in the time required for the evaporation and with a substantial saving in the steam required to be supplied to the boosters or reheaters.

Furthermore, in my invention the masses of material are isolated, and the drying medium is directed or controlled so that it flows into intimate contact with the masses, it being desirable to place one or more masses in chambers separate from the chambers containing the other masses, and said separating or dividing means operating to direct the flow of the drying medium into the desired intimate contact with each mass throughout the series of masses.

In the drawings,

Figure 1 is a side elevation of one form of apparatus suitable for carrying out the process.

Fig. 2 is a vertical cross section through a series of material-treating chambers illustrating the path in which the drying medium flows into contact with the layers of material.

Fig. 3 is a cross section on the line 3—3 of Fig. 2.

In the apparatus selected for illustration as being suitable for carrying out my process, A designates a casing the interior of which is divided longitudinally and transversely, as will hereinafter appear, for the purpose of producing a series of material-treating chambers. Combined with said casing A is a flue into which a drying medium, such as atmospheric air, is admitted for the purpose of preheating the drying medium prior to its admission to the material-treating chambers, and a separate flue into which warm air from the material-treating chambers is discharged in such a manner that the heat of the outflowing warm air is utilized for pre-heating the inflowing air. Casing A is divided transversely by vertical partitions B into a series of material-treating chambers, access to which is obtainable by doors $b$ provided in the front of the casing.

Each material-treating chamber is divided by substantially horizontal partitions $B'$ $B^2$ into a series of compartments and heating chambers, but, as the construction of each material-treating chamber is the same throughout the apparatus, a description of one of said chambers will answer equally for the others. At the top of each material-treating chamber, partition $B'$ and the top wall of the casing form a chamber C into which the drying medium flows through a suitable inlet $c$, said chamber C containing means for warming the preheated drying medium to a temperature suitable for the treatment of the material which is contained on trays D supported within the compartments of the chamber. The means for heating the drying medium to the required temperature is shown in the form of live steam coils E, said coils being of such capacity and number that the pre-heated drying medium, admitted by inlet $c$ into chamber C, will, as said drying medium flows into contact with coils E, be raised to a temperature suitable for treating the material.

Partitions $B'$ $B^2$ alternate with the material-treating chamber for the purpose of producing a series of compartments F, said partitions extending from one wall of the chamber nearly to the other wall thereof, and within these compartments are provided angle irons $d$ for supporting foraminous trays D, or their equivalents, whereby the material is supported in layers within compartments F for the drying medium to circulate over and beneath the material on said trays. In each compartment the angle irons $d$ are positioned to sustain trays D intermediate the substantially horizontal partitions $B'$ $B^2$, in order that the drying medium may flow above and below the material on the trays. It will be noted, by reference to Fig. 2, that the horizontal partitions $B'$ $B^2$ extend from one wall nearly to the other, and that in the space between the short end of the partitions and the other wall is a series of short horizontal partitions $B^3$, the latter being substantially in the plane of trays D. The trays do not extend the full length of the horizontal compartments F and the partitions $B'$ $B^2$, $B^3$, and the trays are so related that heating chambers G G' are provided at the respective ends of the tray-containing compartment. A suitable number of these tray-containing compartments are provided with boosters or heaters H H', adapted to utilize live steam as the means for heating the same, but below these steam heaters or boosters H H' it is preferred to employ other boosters or heaters I I' through which hot water is adapted to circulate. The convolutions of the hot water coils I I' increase in number in the successive coils, that is to say, after the drying medium flows out of the compartments containing the live steam coils, it is brought into contact with one hot water coil I having four convolutions, the next hot water coil I' contains five convolutions, and as the drying medium flows into contact with the succeeding coils the convolutions of said coils increase in number.

One salient feature of this invention consists in boosting or reheating the drying medium each time it flows into contact with the material on the trays, and in the apparatus shown the boosting or reheating means consists of steam coils H H' and hot water coils I I', two of said coils being positioned at the respective ends of each tray, so that as the drying medium flows over one tray it is brought into contact with one coil, the drying medium then flows beneath the tray and is brought into contact with another coil, by which it is boosted or reheated before the drying medium flows over the next tray, and so on throughout the series of compartments F within each material-treating chamber.

In the apparatus shown, the drying medium admitted to chamber C and brought into contact with the first heating coil E, is conducted in a circuitous path and into repeated contact with the material resting upon the trays D of all the compartments within the material-treating chamber, the drying medium flowing back and forth over and beneath the trays and from one compartment into the other, whereby the entire volume of such drying medium supplied continuously to each chamber is brought successively into contact with the layers of material. The drying medium when first admitted is raised to a temperature suitable for evaporating moisture from the particular material under treatment, and as the drying medium flows over the material upon the first tray its temperature is slightly decreased, owing to the fact that said drying medium absorbs moisture from the material, but the drying medium is immediately brought into contact with the booster or heater H', by which its temperature is restored as it flows beneath the first tray. After passing below the first tray, the drying medium flows into chamber G and into contact with the booster or coil H therein, by which the drying medium is restored to its initial temperature before it flows over the second tray, whereupon said drying medium flows through chamber G' and into contact with the booster or coil H' so that the drying medium is reheated or boosted before it flows below the second tray. These operations of conducting the drying medium over and beneath the trays, and into contact with the boosters or heating coils before it passes into the succeeding compartments, are repeated throughout the several compartments of each material-treating chamber, and finally the drying medium flows out by an outlet J. The employment of the boosters or heating coils H H' I I' at the respective ends of the trays, or in chambers at the ends of the tray-containing compartments, provides efficient means for keeping the drying medium at a predetermined temperature in order to obtain efficiency in depriving the material of moisture, but a distinctive feature of this invention is the very great economy obtained in the fuel required for heating or boosting the drying medium. As hereinbefore stated, the gaseous drying medium is pre-heated prior to its admission to the material-treating chambers. It is brought up to the temperature required by contact with heater E; any slight decrease in its temperature due to evaporation of moisture from the material will result in the drying medium being brought back to a standard temperature by contact with one or more of the boosters or coils H H' I I', and thus, while the drying medium is used repeatedly for contact with the successive layers of material, the temperature of said drying medium is maintained at a predetermined standard by the boosters or coils, as a result of which no very great expenditure of fuel is necessary to maintain the drying medium at the predetermined temperature, and very great efficiency and economy are thus obtained, for the reason that the drying medium when heated at this temperature will be expanded in volume and have a capacity for evaporating moisture from the material under treatment without, however, bringing the heated drying medium to a condition wherein it will be saturated with moisture to such an extent as will result in the deposition of moisture upon the material.

The apparatus is equipped with a particular form of pre-heater, constructed as follows. Extending longitudinally of the casing, at the rear of the material-treating chambers therein, are vertical parallel partitions K L which produce an outlet chamber $k$ and an inlet chamber $l$. The exits from the material-treating chambers open into exit chambers $k$, whence the heated drying medium flows through an exit $k'$ adapted to discharge into a stack or uptake, or at any other suitable place. The drying medium is blown into chamber $l$ by a fan L' having a connection $l'$ with chamber $l$, and with this chamber *l* communicates the openings *c* of heating chambers C, whereby the drying medium, pre-heated in chamber *l*, is free to flow through openings *c* into the series of chambers C at the upper ends of the material-treating chambers.

The chamber *k* is positioned between the material-treating chamber and the pre-heating chamber *l*, so that the heat present in the drying medium flowing out of the material-treating chambers will be utilized for preliminarily heating the inflowing drying medium which circulates through chamber *l*. To this end baffles *m m'* are positioned within chambers *k l*, respectively, and heat-transmitting baffles *o p* are provided on the partitions L, and within the respective chambers *k l*. Preferably, the partitions L and baffles *o p* are composed of a metal sensitive to the action of heat, such as copper. The warm drying agent from the material-treating chambers flows into exit chamber *k*, and into contact with copper partition L and copper baffles *o*, the warm gaseous agent being directed toward parts L *o* by one or more baffles *m*. The drying agent is thus brought into contact with the parts L *o* for the purpose of giving off its heat to these parts, whereby the heat will be transmitted by baffles *o* to baffles *p* and the heat will be radiated by partition L into chamber *l*. The drying agent flowing into the chamber through inlet *l'* is brought into contact with the partition L and baffles *p*, the inflowing agent being directed toward the baffles *p* by one or more baffles *m'*. As a result, the inflowing drying agent is preliminarily heated before its admission to chamber C, and the heat contained in the out-flowing drying agent is utilized for pre-heating the inflowing agent.

The material is placed on foraminous trays D, and when the doors *b* to the material-treating chambers are open, the filled trays are placed upon the angle irons *d* for the purpose of supporting the trays and the material within the compartments F. The blower circulates a gaseous drying agent through chamber *l*, inlets *c*, and chambers C, and thence through exit *k'*. As the drying agent flows through chamber *l*, it is heated by the warm drying agent flowing out of chamber *k*, and as the drying medium flows through chambers C and into contact with coils E, such inflowing current is heated to the temperature required, say to 240° Fahrenheit. The drying agent flows back and forth through each compartment F, and successively from one compartment into the other. The contact of the drying agent with the material upon the trays results in the evaporation of a certain amount of moisture from such material, so that the temperature of the drying agent is slightly lowered, but before such drying agent is brought into contact again with the material, it flows into contact with one or the other of the boosters or heaters, by which the temperature is slightly increased so as to restore the heat lost by the evaporation of moisture and thus maintain the drying agent at a predetermined standard temperature notwithstanding the evaporation of moisture by the heat present in the drying agent. The drying agent is used repeatedly and is boosted or heated in the intervals between its contacts with the material, thus resulting in economy and efficiency of operation, but the heat present in the outflowing drying agent, after such agent leaves the material-treating chambers, is utilized in chamber *k* for the purpose of pre-heating the inflowing drying agent.

It is evident that various forms of apparatus may be employed. In the drawings I have shown each material-treating chamber as being separate from, and independent of, every other material-treating chamber, but it may be desired to circulate the drying medium from one chamber into the other chamber, as for example when it is desired to dry materials which give off moisture slowly.

It should be stated that the temperature of the drying agent when admitted to the chambers will be such as is best calculated to act upon the particular material under treatment. Thus, in treating material which readily gives off moisture, the drying agent may be at a temperature varying from 90° Fahrenheit to 140° Fahrenheit, or even higher; other materials which are slow to give off moisture owing to the physical condition of such material will require a drying agent at a higher temperature, and, again, materials such as peat which contain a large percentage of moisture, require treatment by a high temperature moisture-absorbing medium, such as direct heat or boiler room gases. In all instances, however, the means for reheating the drying medium operates to maintain said drying medium substantially at the desired predetermined temperature, for the reason that the loss in temperature due to the contact of the drying medium with the material will be offset by the action of the reheating or boosting coils which are positioned in the path of the drying medium so that the latter will have direct contact therewith as it circulates through the series of compartments.

An essential feature of the apparatus is that the partitions and material-supporting trays are inclined relatively to each other, in order that the drying medium will flow through tapering spaces positioned above and below the trays, whereby the flow of the drying medium above the tray is retarded and brought under pressure so as to direct said medium into intimate contact with material on such tray, and the drying medium flowing below the tray is similarly retarded so that said medium will likewise be under pressure and directed into intimate contact with the material thereon. The drying medium thus circulates back and forth through each compartment, and successively through the several compartments, in a manner to have the desired intimate contacts with the material which is supported in separated layers within the several compartments, the large volume of the drying medium supplied by the blower being pre-heated, used continuously and repeatedly in contact with the material, and boosted or re-heated at frequent intervals so as to maintain the drying medium substantially at the predetermined temperature.

According to my invention the direction of flow of the gaseous drying current is reversed immediately following one contact with the material and prior to the next contact with such material, and at or during this period of reversal in the direction of flow the drying medium is conditioned so as to render it capable of evaporating more moisture or, in other words, to substantially increase its moisture-evaporating capacity. This operation of bringing the drying medium to a condition of increased moisture-evaporating capacity at the period of reversing the direction of flow, is effected within the heating or boosting chamber which connects two adjacent passages, such operation being brought about by the action of the booster or reheater contained within said chamber. The drying agent flowing out of one passage, and bearing a certain percentage of moisture, is brought immediately into contact with the surfaces of the booster or reheater, as a result of which the drying medium is expanded and agitated so as to diffuse the moisture through, and mix it uniformly with, such drying medium, which diffusion of the moisture, when taken in connection with the step of boosting or reheating the drying medium so as to restore the temperature (lost by the previous absorption of moisture), brings said drying medium into a superior moisture-absorbing condition prior to said drying medium flowing again into contact with the material. These operations of restoring the drying medium to a proper condition for evaporating moisture takes place between the contacts of such drying medium with the upper surface and the under surface, respectively, of each mass of material, and, also, between the contacts with the successive masses.

Furthermore, in my invention the drying medium is admitted at the top of the treating chamber and flows back and forth therein, or in a circuitous path, in a generally downward direction, but it is apparent that said drying medium may, if desired, be directed to flow in an upward direction.

The heavy or moisture-laden current from the material-treating chambers (one or more) flows under pressure into exit chamber $k$, and by reason of such pressure the gaseous agent is lifted through chamber $k$ and flows out through exit $k'$. During such flow, the drying agent is chilled, in a measure, by parting with its heat for the purpose of pre-heating the inflowing current admitted to chamber $l$, but should it become necessary, means may be provided for exhausting the moisture-laden current from the exit chamber, as is obvious to those skilled in the art.

The present application is a continuation of and covers substantially the same matter as my prior application Serial No. 759,087 filed April 5, 1913.

Having thus fully described the invention, what I claim as new, and desire to secure by Letters Patent is:

1. In the art of drying moisture-containing materials, the process which consists in circulating a gaseous drying medium into contact with a mass of material to be treated and simultaneously therewith retarding the flow of such drying medium so as to direct it against the material and reheating the drying medium subsequent to its contact with said material, and repeating the operations until said drying agent absorbs a predetermined quantity of moisture from said material.

2. In the art of drying moisture-containing materials, the process which consists in circulating a heated gaseous drying medium into contact successively with the upper surface and the under surface of a mass of material to be treated and simultaneously with the flow of the drying medium reheating or boosting said drying medium and retarding the flow of such drying medium while in contact with said surfaces of the material.

3. In the art of drying moisture-containing materials, the process which consists in circulating a gaseous drying medium, heated to a predetermined temperature, into contact alternately with masses of material to be treated and with heating surfaces for reheating such drying medium to the predetermined temperature and simultaneously with such circulation retarding the flow of the drying medium so as to direct it against the material.

4. In the art of drying moisture-containing materials, the process which consists in dividing the material to be treated into individual masses respectively in separate compartments, and circulating a gaseous drying medium, heated to a predetermined temperature back and forth within each compartment and successively into contact with the individual masses and during such flow reheating the drying medium to maintain it at the predetermined temperature and retarding such flow in the presence of the material so as to result in intimate contact of the drying medium with the respective surfaces of each mass of material.

5. In the art of drying moisture-containing materials, the process which consists in controlling the flow into contact with separated masses of a drying medium the temperature of which is proportioned to the moisture content of the first mass so as to leave the latter in a condition free for transudation of moisture therefrom while effecting the desired exchange of heat for moisture, and reheating said drying medium in the intervals between its contacts with the successive masses so as to maintain said drying medium at a temperature which leaves all of said masses, subsequent to said initial contact with the first mass, in a condition for the free transudation of moisture from each of said successively treated masses.

6. In the art of drying moisture-containing materials, the process which consists in separating the material into individual masses, controlling the flow into contact with the masses successively of a drying medium heated to a temperature which leaves the first mass in a condition free for the transudation of moisture therefrom while effecting the exchange of heat for moisture from said first mass, and reheating the drying medium in the intervals between its successive contacts with the remaining masses so as to maintain said medium at the temperature which permits each of said successive masses to remain in a condition free for the transudation of moisture from the constituent parts thereof.

7. In the art of drying moisture-containing materials, the process which consists in preheating a drying medium to a predetermined temperature, controlling the flow into successive contact with a number of separated masses of a drying medium the temperature of which leaves the first mass contacting therewith in a condition free for the transudation of moisture while effecting the desired exchange of heat for moisture, and reheating the drying medium in the intervals between its successive contacts with said masses other than the first so as to maintain said drying medium at the predetermined temperature which leaves the successive masses in a condition free for the transudation of moisture therefrom.

8. In the art of drying moisture-containing materials, the process which consists in separating said material into individual masses, preheating a drying medium to a predetermined temperature, controlling the flow into successive contact with the masses of the drying medium, the temperature of which leaves the first mass under treatment in a condition for the free transudation of moisture therefrom while effecting the desired exchange of heat from the medium for moisture from the mass, and reheating the drying medium in the intervals between its successive contacts with the masses other than the first so as to maintain uniform temperature in the drying medium, the effect of which upon the successive masses is to leave them in a condition free for the transudation of any moisture present therein.

9. In the art of drying moisture-containing materials, the process which consists in separating the material into individual masses, preheating air to a predetermined temperature, controlling the flow into contact with the successive masses of the preheated air, the temperature of which is such as to leave the first mass under treatment in a condition for the free transudation of moisture therefrom while at the same time effecting the desired exchange of heat from the air for moisture from the mass, and reheating air in the intervals between its successive contacts with the masses and to thereby maintain said air uniformly throughout its flow at the predetermined temperature which while exchanging heat for moisture leaves each of the successive masses in a condition for the free transudation of any moisture present therein.

10. In the art of drying moisture-containing materials the process which consists in controlling the flow of a drying medium so as to direct the same into contact successively with separated masses of such material, the temperature of which drying medium is apportioned to the moisture content of the first mass whereby the latter remains in a condition for the free transudation of moisture while effecting the exchange of heat for moisture, and boosting said drying medium in the intervals between its contacts with the successive masses other than the first mass so as to maintain at uniform temperature the drying medium in its flow between the inlet to and the exit from the circulatory path, the effect due to said boosting of the action of said drying medium upon the successive masses being to exchange heat for moisture and leave each mass in a condition for the free transudation of moisture therein.

11. In the art of drying moisture-containing materials, the process which consists in controlling the flow of a drying medium so as to direct the same under pressure and into contact successively with separated masses of such material, the temperature of which drying medium is apportioned to the moisture content of the first mass whereby the latter remains in condition for the free transudation of moisture while effecting the exchange of heat for moisture, and boosting said drying medium during its period of control and in the intervals between successive contacts with said masses other than the first mass so as to maintain at substantially uniform temperature the drying medium during its flow between the inlet to and the exit from its circulatory path, the effect due to said boosting of the action of said drying medium upon the successive masses being to exchange heat for moisture and to leave each mass in a condition for the free transudation of moisture.

In testimony whereof, I have hereunto subscribed my name.

GORDON DON HARRIS.